Figure 1:
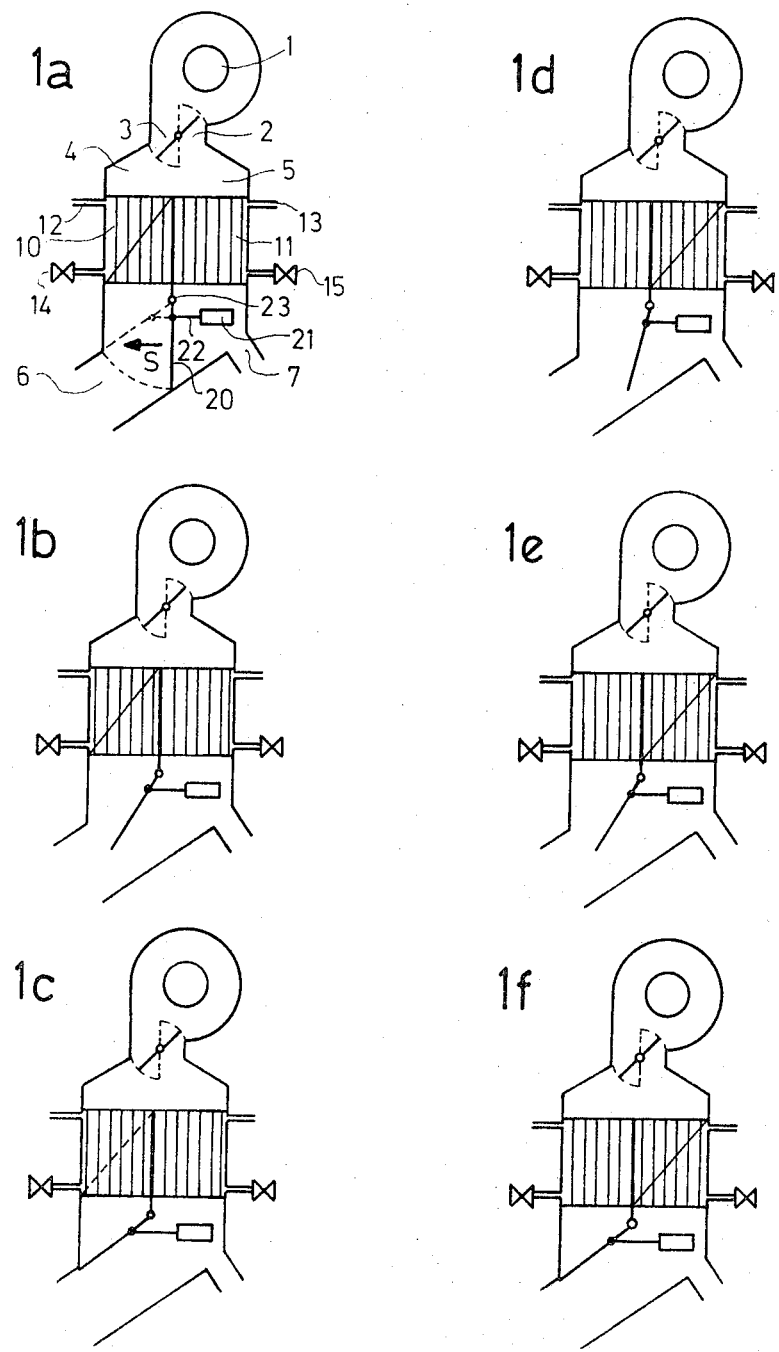

United States Patent [19]

Steinmann

[11] 3,841,395

[45] Oct. 15, 1974

[54] TEMPERATURE CONTROL FOR VEHICLE PASSENGER SPACE

[75] Inventor: Helmut Steinmann, Baden-Baden, Germany

[73] Assignee: Robert Bosch GmbH, Stuttgart, Germany

[22] Filed: Jan. 15, 1973

[21] Appl. No.: 323,515

[30] Foreign Application Priority Data
Mar. 3, 1972 Germany.............................. 2210212

[52] U.S. Cl........................ 165/35, 165/42, 236/13
[51] Int. Cl. .......................................... G05d 23/00
[58] Field of Search .......... 165/34, 35, 26, 27, 126, 165/23, 42; 236/13

[56] References Cited
UNITED STATES PATENTS

| | | | |
|---|---|---|---|
| 2,130,089 | 9/1938 | Hull | 236/13 |
| 2,284,764 | 6/1942 | Parks | 236/13 |
| 2,430,759 | 11/1947 | Crise | 236/13 |
| 2,508,749 | 5/1950 | Denis | 165/35 |
| 2,521,866 | 9/1950 | Ott | 165/34 |
| 3,170,509 | 2/1965 | De Rees | 165/42 |
| 3,179,338 | 4/1965 | Ostrander | 236/13 |
| 3,191,669 | 6/1965 | Johnson | 165/42 |
| 3,421,576 | 1/1969 | Roane | 165/42 |

Primary Examiner—Manuel A. Antonakas
Assistant Examiner—Daniel J. O'Connor
Attorney, Agent, or Firm—Flynn & Frishauf

[57] ABSTRACT

A blower supplies outside air to two ducts in one of which the air may be heated in cold weather and in the other of which air may be cooled in warm weather. At the downstream junction of these ducts a flap valve, positioned by a thermosensitive expansion element located in the cooler of the two air streams, determines the proportion in which the two air streams will contribute to the air delivered to the passenger space. A vent of small cross-section downstream from the thermosensitive element assures a minimum flow of the cooler air stream sufficient to actuate the control.

10 Claims, 6 Drawing Figures

PATENTED OCT 15 1974

3,841,395

TEMPERATURE CONTROL FOR VEHICLE PASSENGER SPACE

This invention relates to a system for maintaining constant the temperature in the passenger space of a motor vehicle by means of an air conditioner, provided with a heater, a cooling device, or both, and more particularly with such systems in which a flap valve is used for mixing air of different temperatures to vary the heating or cooling effect of the system.

Systems of this type are known in which all the control devices of the heating and air conditioning system which affect the temperature of the air stream delivered to the interior of the motor vehicle are continually adjusted by a regulating device. The temperature of the interior of the motor vehicle can be held very exactly to a prescribed value with these known devices, but such systems are excessively expensive, because at least one positioning device is necessary for each control device to be regulated.

It is an object of the invention to provide a system for maintaining constant the temperature in the interior of a motor vehicle which can be produced with the least possible engineering and production expense.

SUBJECT MATTER OF THE PRESENT INVENTION

Briefly, the blower of the system is caused to deliver air at different temperatures through two separate ducts and a flap valve is used to control the relative proportion of the two streams of air delivered to the vehicle interior by a delivery duct. The vane of the mixing valve is controlled by a positioning device that at the same time serves to measure the temperature of the cooler of the two air streams, The response of the positioning member to the temperatture of that air stream is such that when the temperature of the cooler air stream increases, the proportion of the warmer air stream in the delivered air is reduced and when the temperature of the cooler air steam falls, the proportion of the warmer air stream is increased.

When the air circulating system of the vehicle includes both a first heat exchanger serving at times to heat one air stream and a second heat exchanger serving at other times to cool the other stream, the temperature sensitive positioning member for the mixing valve is preferably located downstream of the cooling element. The heat exchanger serving as a cooling element may, for example, be constituted by the evaporator coils of an air conditioning system.

The invention will be described by way of example with reference to the accompanying drawings, wherein:

FIGS. 2, 3, 4, 5 and 6 are all diagrammatic cross-sections of the blower, duct heat exchanger and mixing valve assembly of the air conditioning system of a vehicle, respectively, shown with different positions of the mixing valve.

The air conditioning system has a blower 1, adapted to blow air through a preliminary duct 2 fitted with a throttle valve 3 for controlling the rate of air circulation. The air supply for the blower in the system illustrated is taken from the outside air. Arrangements may be provided, however, for taking the air supply for the system partly or wholly from the interior air, by means not shown in the drawing, as may be convenient in very hot or very cold weather.

The preliminary delivery duct 2 branches into two adjacent parallel ducts 4 and 5, which both discharge into a delivery duct 6. From this delivery duct conduits, not shown in the drawing, lead to the individual air discharge openings in the passenger space of the motor vehicle and at or neat the branching points members for control of the relative air distribution, likewise not shown, may be provided.

A heat exchanger 10 serving as a heater is assoicated with the air duct 4. In the duct 5 a heat exchanger 11 serving as a cooling element is similarly provided. Both of the heat exchangers are diagrammatically shown, with piping 12 and 13, respectively, supplying heating and cooling fluid to the heat exchangers 10 and 11. The flow of these fluids through the respective heat exchangers can be shut off (or adjusted) by means of the valves 14 and 15.

A mixing valve, shown in the form of a flap valve 20, is provided at the downstream junction of the ducts 4 and 5 and provides for varying the proportion in which the respective air streams of the ducts 4 and 5 contribute to the flow of air finally delivered through the main delivery duct 6. The vane of this mixing valve is actuated by a positioning member 21 on the side of the vane towards the duct 5, so that it lies in the air stream coming out of the heat exchanger 11 which serves as a cooling device. This positioning member 21 is a thermal expansion device having a movable rod 22 connected to the valve vane 20 at a point spaced from its pivot 23. When this thermal expansion device is warmed, the rod 22 moves in the direction of the arrow S and shifts the position of the flap valve 20 in such a way as to reduce the amount of air from the duct 4 that can reach the delivery duct 6.

The manner of operation of the system is best explained with reference to the individual FIGS. 1, 2 . . . 6 representing different conditions of operation. In these Figures the heat exchanger which is in operation in the particular case is indicated by a diagonal line across the representation of the heat exchanger.

In FIG. 1 the vane of the mixing valve 20 is in a position such that only air from the air duct 4 can reach the delivery duct 6. The heat exchanger 10 which operates as a heater is in operation, so that the air supplied to the vehicle interior space is all hot air. Cold air flows through the air duct 5, but it cannot go to the main delivery duct 6 and is vented through an orifice of relatively small cross-section back into the open air. The mixing valve takes this position when the outer air temperature is very low.

In the case of somewhat higher outer air temperature the expansion device 21 serving as positioning member is warmer, so that the movable rod 22 is shifted in the direction of the arrow S. The vane of the mixing valve 20 is thereby swung over clockwise about its pivot 23, so that the proportion of the delivered air which comes out of the air duct 4 is smaller, while at the same time the proportion of the air coming out of the air duct 5 is greater. These two air streams are mixed in the delivery duct, so that for this position of the mixing valve, as shown in FIG. 2, the temperature of the delivered air is lower than in the case of the mixing valve position shown in FIG. 1. If the outer air temperature becomes still higher, the mixing valve 20 is swung still further in the clockwise direction by the positioning member 21 until the duct 4 is fully closed off, as shown in FIG. 1c. Then only outside air flowing through the duct 5 with unchanged temperature flows into the interior space of the motor vehicle.

If the outside temperature reaches so high a value that the duct 4 is fully closed by the control member of the valve 20, the heat exchanger serving as a heater is turned off. That may be done by means of a thermostat, not shown in the drawing, which shuts off the heat exchanger in response to the temperature of the outside air, and such a thermostat may also at the same time, or after some delay or a still further rise in temperature, turn on the heat exhanger 11 which operates as a cooling device. This switching over can also be performed by a mechanical switching device operated in dependence on the position of the mixing valve. If desired, this switching function could also be performed by a manual control.

If when the mixing valve is in the position shown in FIG. 1c the heat exchanger functioning as a cooler is turned on, the expansion element 21 operating as a positioning member will be cooled so that the mixing valve 20 will swing counterclockwise on its pivot. Since the heat exchanger 10 that serves as a heater is no longer in operation, the air stream delivered by the duct 6 will now be composed in part of unaffected outside air from the duct 4 and in part of cool air from the duct 5.

If the outside temperature rises further, the air coming out of the cooler 11 and striking the positioning member 21 will become warmer, so that the mixing valve 20 is again shifted in the clockwise direction, till at quite high temperature values the duct 4 is again fully closed off and only cooled air from the duct 5 reaches the delivery duct 6 and is thereby delivered to the passenger space of the motor vehicle.

In FIGS. 1 and 2 the air circulation system is operating as a heater, whereas in FIGS. 5 and 6 the system provides cooling, while in FIGS. 3 and 4 the system is shown at the stage of switching from heating to cooling.

Although the system here illustrated and described operates in dependence upon the outside air temperature and thus may not be able to counteract some temperature variations in the motor vehicle interior, such as may arise as the result of opening a window, it has been found that especially during operation as a heater the temperature in the motor vehicle interior can be very exactly held by the system at a prescribed value, even though the temperature of the air delivered by the system is controlled by only one control device actuated by a single positioning member. The particular advantage should also be mentioned that when the air conditioner is turned on (compare FIG. 1c and FIG. 1d) the positioning member remains a considerable time in the position in which only cooled air from the duct 5 can be delivered to the motor vehicle interior. The period of time for which the mixing valve remains in that position depends upon the thermal time constant of the positioning member 21, which is to say the heat storage capacity of the member and hence the time taken by that member to warm up or cool down to the temperature of the air flowing by it. Very quick cooling of the vehicle interior can thus be obtained when the outside temperature is high. If it is desired to increase this effect, the positioning member 21 may be designed with a relatively large thermal time constant or it may be provided with means, not shown, for increasing the thermal time constant at high temperatures or when the cooler is turned on.

Although the invention has been disclosed with reference to a particular illustrated embodiment, it will be understood that modifications may be made without departing from the spirit of the invention. For example, a provision may be added (not shown in the drawing) for causing the vent 7 to discharge air into the passenger space rather than outside the vehicle when the cooling heat exhanger 11 is in operation.

I claim:

1. A system for maintaining constant the temperature of an air space comprising:

blower means including a blower and two output ducts for delivering, respectively, two air streams of different temperatures, to a duct junction and including also means for supplying said blower with fresh air;

main delivery duct means for delivering air from said duct junction towards said air space;

mixing valve vane (20) means in or at said duct junction for determining by its position the relative proportion of air from said two air streams to be delivered by said main delivery duct means;

thermosensitive means (21) for positioning said vane means in response to the temperature of the cooler of said air streams and for decreasing, under increasing temperature of said cooler stream, the proportion of said warmer stream to be delivered through said main delivery duct and for increasing, under decreasing temperature of said cooler stream, the proportion of said warmer stream so delivered, said thermosenstive means being in the form of a positioning member connected to said vane means.

2. A system for maintaining constant temperature as defined in claim 1 in which said vane means (20) is adapted in its extreme positions to exclude air of one or the other of said streams from said main delivery duct means and in which an auxiliary delivery duct of relatively small cross section (7) is provided with connections such as to assure that a flow of air of said cooler stream flows past said thermosensitive means (21) even when air of said cooler stream is exculded from said main delivery duct means.

3. A system for maintaining constant temperature as defined in claim 1 in which a heat exchanger adapted to serve as a heating element is assoicated with the duct through which said warmer air stream flows from said blower to said mixing valve vane means and in which a second heat exchanger adapted to serve as a cooling element is associated with the duct through which said cooler air stream flows from said blower to said mixing valve vane means and in which said thermosensitive means (21) is positioned downstream of said cooling heat exchanger (11).

4. A system for maintaining constant temperature as defined in claim 3 in which the two said heat exchangers (10, 11) are adapted to be alternately placed in operation by a manual switching or changeover device.

5. A system for maintaining constant temperature as defined in claim 3 in which the two said heat exchangers (10, 11) are arranged to be placed alternatively in operation by a thermostatic device.

6. A system for maintaining constant temperature as defined in claim 5 in which said thermostatic device constitutes means for placing one or the other of said heat exchangers in operation in dependence upon the outside air temperature.

7. A system for maintaining constant temperature as defined in claim 1 in which said thermosensitive means (21) is or includes an expansible material element and is directly responsive to the expansion thereof.

8. A system for maintaining a constant temperature as defined in claim 1 in which said thermosensitive means (21) is or contains a liquid filled expansion element.

9. A system for maintaining constant temperature as defined in claim 1 in which directly downstream of said thermosensitive means in the path of said cooler air stream an air exit (7) of relatively small cross-section is provided, whereby said cooler air stream is assured a minimum rate of flow.

10. A system for maintaining constant temperature as defined in claim 1 in which said thermosensitive means (21) is so constructed that it possesses a variable thermal time constant that is variable in response to an operating condition.

* * * * *